(12) United States Patent
Fritz-Langhals et al.

(10) Patent No.: US 11,440,926 B2
(45) Date of Patent: Sep. 13, 2022

(54) METHOD FOR PREPARING AMINOPROPYLSILANES

(71) Applicant: WACKER CHEMIE AG, Munich (DE)

(72) Inventors: Elke Fritz-Langhals, Ottobrunn (DE); Richard Weidner, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 141 days.

(21) Appl. No.: 16/603,329

(22) PCT Filed: Feb. 6, 2018

(86) PCT No.: PCT/EP2018/052942
§ 371 (c)(1),
(2) Date: Oct. 7, 2019

(87) PCT Pub. No.: WO2019/154479
PCT Pub. Date: Aug. 15, 2019

(65) Prior Publication Data
US 2021/0284666 A1   Sep. 16, 2021

(51) Int. Cl.
*C07F 7/18* (2006.01)
*C07F 7/20* (2006.01)

(52) U.S. Cl.
CPC .............. *C07F 7/1888* (2013.01); *C07F 7/20* (2013.01)

(58) Field of Classification Search
CPC ........ C07F 7/0801; C07F 7/10; C07F 7/1888; C07F 7/20
See application file for complete search history.

(56) References Cited

U.S. PATENT DOCUMENTS

| | | | | |
|---|---|---|---|---|
| 4,276,423 A * | 6/1981 | Muller | ............... | C07F 7/10 556/411 |
| 4,584,392 A * | 4/1986 | Smith | ................... | A61K 47/56 536/112 |
| 4,584,393 A | 4/1986 | Webb et al. | | |
| 4,631,346 A | 12/1986 | Webb et al. | | |
| 5,281,736 A | 1/1994 | Tachikawa | | |
| 7,202,375 B2 * | 4/2007 | Tonomura | ................ | C07F 7/12 556/425 |
| 8,450,512 B1 * | 5/2013 | Piskoti | ................. | C07F 7/0838 556/407 |
| 2015/0051418 A1 | 2/2015 | Fritz-Langhals et al. | | |
| 2015/0112092 A1 | 4/2015 | Fritz-Langhals | | |
| 2018/0230273 A1 | 8/2018 | Fritz-Langhals et al. | | |

FOREIGN PATENT DOCUMENTS

| | | |
|---|---|---|
| DE | 3546376 A1 | 7/1986 |
| DE | 3606262 A1 | 9/1986 |
| DE | 102015207673 A1 | 10/2016 |
| EP | 0578186 A1 | 1/1994 |
| EP | 2828270 A1 | 1/2015 |
| EP | 2841489 B1 | 8/2015 |
| EP | 3315503 A2 * | 5/2018 ............... C07F 7/10 |
| JP | 2235891 A | 9/1990 |
| JP | H04243883 A1 | 8/1992 |
| JP | 11021289 A * | 1/1999 |
| JP | H1121289 A1 | 1/1999 |
| WO | 2013139604 A1 | 9/2013 |

OTHER PUBLICATIONS

R. Januszewski et al., 846 Journal of Organometallic Chemistry, 263-268 (2017) (Year: 2017).*
H. Allcock et al., 10 Organometallics, 3819-3825 (1991) (Year: 1991).*
B. Ghose, 164 Journal of Organometallic Chemistry, 11-18 (2017) (Year: 1979).*
Ehbets et al.: "Alkoxy(aminoalkyl)silanes", Eur. J. Inorg. Chem. Wiley-VCH, 2016, No. 11, pp. 1641-1659.
JP 2235891 A2, English Machine Translation.
Harry R. Allcock et al., Synthesis and Reactivity of Cyclotriphosphazenes Bearing Reactive Silane Funtionalities: Novel Deriviies via Hydrosilylation Reactions, Organometallics, Nov. 1, 1991, pp. 3819-3825, vol. 10, No. 11, American Chemical Society, Washington DC.
Saam et al: "Preparation of 3-Triethoxysilylpropylamine and 1,3-Bis(3-aminopropyl)tetramethyldisiloxane", vol. 24, Jan. 1959, XP-002463541, pp. 119-120.

* cited by examiner

*Primary Examiner* — Alexander R Pagano
(74) *Attorney, Agent, or Firm* — Brooks Kushman P.C.

(57) ABSTRACT

Aminopropylalkoxysilanes of the formula $$H_2N-CR^2R^3-CHR^1-CH_2-SiR^4R^5(OR^6) \qquad I,$$

are synthesized by hydrosilylating silazanes of the formulae

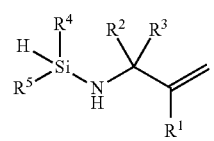

IVa

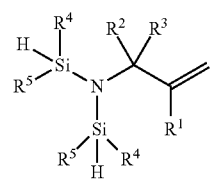

IVb and mixtures thereof, in the presence of a catalyst containing rhodium and/or iridium compounds, and then reacted with alcohol to form an aminopropylalkoxysilane.

10 Claims, No Drawings

METHOD FOR PREPARING AMINOPROPYLSILANES

CROSS REFERENCE TO RELATED APPLICATIONS

This application is the U.S. National Phase of PCT Appln. No. PCT/EP2018/052942 filed Feb. 6, 2018, the disclosure of which is incorporated in its entirety by reference herein.

BACKGROUND OF THE INVENTION

1. Field of the Invention

The invention relates to the preparation of primary 3-aminopropylalkoxysilanes via hydrosilylation in the presence of rhodium or iridium compounds.

2. Description of the Related Art

Primary 3-aminopropylalkoxysilanes are important intermediates in industry and are especially suitable for end-capping hydroxy-functional siloxanes to form terminally functionalized aminoalkylsiloxanes, known as amine oils. Polysiloxanes terminally functionalized with a primary 3-aminopropyl group, the amine oils just mentioned, are used in many sectors of silicone chemistry, for example in the preparation of copolymers. In order to be able to prepare copolymers with high molecular weights, the amine oils must be terminally functionalized as completely as possible. However, even in other applications, incomplete terminal functionalization reduces product quality, since chain degradation processes start at the uncapped Si—OH chain ends.

Equilibration methods using bis-3-aminopropyldisiloxanes only provide amine oils with incompletely reacted chain ends, while capping methods using 3-aminopropylalkoxysilanes, as described in DE102015207673 A1 and EP2841489 B1, can achieve complete capping, for which reason only 3-aminopropylalkoxysilanes have been suitable for amine oil production.

EP2828270 A1 describes a method for preparing 3-aminopropylalkoxysilanes from the corresponding 3-chloropropylalkoxysilanes and a 20 to 30 time molar excess of ammonia. This method is relatively costly on account of high pressure requirements. A further disadvantage of this method is that the 3-chloropropylsilanes used as reactants have to be prepared via platinum-catalyzed hydrosilylation of allyl chloride, in which only moderate yields can be achieved due to a secondary reaction, propene cleavage.

A simple method which is performed at atmospheric pressure and provides the 3-aminopropylalkoxysiloxanes in good yields and with a high purity has therefore not yet been available.

Harry R. Allcock et al. (Organometallics 1991, 10 (11), 3819-3825) discloses a method for preparing (3-aminopropyl)dimethylethoxysilane starting from N-(trimethylsilyl)allylamine and dimethylethoxysilane in the presence of a platinum catalyst. However, the removal of the trimethylsilyl group is necessary to obtain the product, and only a yield of 68% is achieved.

SUMMARY OF THE INVENTION

The invention provides a method for synthesizing 3-aminopropylalkoxysilanes of the general formula I $$H_2N\text{—}CR^2R^3\text{—}CHR^1\text{—}CH_2\text{—}SiR^4R^5(OR^6) \quad \text{I,}$$

in which silazanes, selected from the formulae IVa and IVb

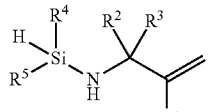

IVa

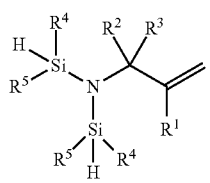

IVb and mixtures thereof, are hydrosilylated in the presence of a catalyst A, which contains compounds selected from rhodium and iridium compounds and mixtures thereof, and, for conversion to the 3-aminopropylalkoxysilanes of the general formula I, are reacted with alcohol of the general formula V $$R^6\text{—OH} \quad \text{V,}$$

where $R^1$ to $R^3$ independently of one another are hydrogen or a monovalent unsubstituted or substituted $C_1$-$C_{20}$ hydrocarbon radical, where individual, non-adjacent methylene units in the hydrocarbon radical may be replaced by —O—, —CO—, —COO—, —PCO— or —OCOO—, —S— or $NR^x$ groups, and where the radicals may be bridged by hydrocarbon radicals, $R^4$ and $R^5$ independently of one another are a monovalent unsubstituted or substituted $C_1$-$C_{20}$ hydrocarbon radical, where individual, non-adjacent methylene units in the hydrocarbon radical may be replaced by —O—, —CO—, —COO—, —OCO— or —OCOO—, —S— or $NR^x$ groups, and where the radicals may be bridged by hydrocarbon radicals, $R^6$ is a hydrocarbon radical having 1 to 8 carbon atoms, where non-adjacent carbon atoms may be replaced by oxygens, and $R^x$ is a monovalent unsubstituted or substituted $C_1$-$C_{20}$ hydrocarbon radical, where individual, non-adjacent methylene units in the hydrocarbon radical may be replaced by —O—, —CO—, —COO—, —OCO— or —OCOO—, —S— groups, and where the radicals may be bridged by hydrocarbon radicals.

DETAILED DESCRIPTION OF THE PREFERRED EMBODIMENTS

The method according to the invention can be conducted at atmospheric pressure and in a simple manner and provides the desired aminopropylalkoxysilanes having a primary amino group in good yields with only small proportions (approximately 2 to 4%) of the isomeric product, referred to as the ß product Ia.

$$H_2N\text{—}CR^2R^3\text{—}CMeR^1\text{—}SiR^4R^5(OR^6) \quad \text{Ia}$$

A further advantage of the method is that low-cost starting materials such as allylamine and dimethylchlorosilane can be used for preparing the silazane mixture of the general formulae IVa and IVb and no further reagents are required.

EP 0578186 describes the intramolecular hydrosilylation of diallylamines using rhodium catalysts to form 5-ring silazanes. No 3-aminopropylalkoxysilanes having a primary amino group can be produced via this method, since the nitrogen is irreversibly blocked by a non-removable alkyl group.

In addition, DE 3546376 describes the reaction of mixtures of monosilazane IVa and disilazane IVb (obtainable according to DE 3606262) with platinum catalyst, and the subsequent hydrolysis to disiloxanes which, however, exist as isomeric mixtures; therefore DE 3546376 recommends using for the hydrosilylation only the monosilazane, the preparation of which in pure form, however, is difficult and costly, since it can be converted into the disilazane and allylamine.

Neither of the two documents describes the preparation of 3-aminopropylalkoxysilanes which, as explained above, are particularly suitable for amine oil preparation. Based on the published documents, it is therefore unexpected for the rhodium-catalyzed hydrosilylation of the monosilazane/disilazane mixture to lead to an essentially homogeneous 3-aminopropylalkoxysilane of the general formula I with only low proportions of isomeric ß product of the general formula Ib.

In the method, the silazanes of the general formulae IVa and IVb may be used in any ratio. Pure silazanes of the general formulae IVa or IVb may also be used. It is preferred to use a mixture containing 10 to 80% by weight, especially 20 to 60% by weight, of silazane of the general formula IVa, based on the sum total of silazanes of the general formulae IVa and IVb.

$R^1$ to $R^3$ independently of one another are preferably a hydrogen atom or a monovalent unsubstituted or substituted $C_1$-$C_6$ hydrocarbon radical, where individual, non-adjacent methylene units in the hydrocarbon radical may be replaced by $NR^x$ groups. $R^4$ and $R^5$ independently of one another are preferably a monovalent unsubstituted or substituted $C_1$-$C_6$ hydrocarbon radical, where individual, non-adjacent methylene units in the hydrocarbon radical may be replaced by —O— or $NR^x$ groups. $R^6$ is preferably a hydrocarbon radical having 1 to 4 carbon atoms, where non-adjacent carbon atoms may be replaced by oxygens.

$R^x$ is preferably a monovalent unsubstituted or substituted $C_1$-$C_6$ hydrocarbon radical.

Preferred substituents on $R^1$ to $R^5$ are halogens, especially fluorine, chlorine or bromine radicals or cyano radicals.

$R^2$ and $R^3$ independently of one another are more preferably hydrogen or a methyl group.

$R^1$ is very preferably hydrogen.

$R^4$ and $R^5$ independently of one another are more preferably a monovalent unsubstituted $C_1$-$C_6$ hydrocarbon radical, especially a methyl, ethyl, n-propyl or i-propyl group.

$R^6$ is more preferably a methyl, ethyl, n-propyl or i-propyl group.

$R^x$ is very preferably a monovalent unsubstituted $C_1$-$C_6$ hydrocarbon radical, especially a methyl, ethyl, n-propyl or i-propyl group.

The hydrosilylation is conducted in the presence of a catalyst A, which contains compounds selected from rhodium and iridium compounds and mixtures thereof.

A preferably contains one or more rhodium or iridium compounds bearing complexing ligands.

Rh or iridium complexes that can be 4-coordinate or 6-coordinate are particularly preferred.

Preferred as ligands are halide, hydrogen, $BF_4^-$, acetylacetonato, mono- or bidentate N, P, As or Sb, N-heterocyclic carbene or alkenyl ligands and carbon monoxide.

Especially preferred ligands are chlorine, bromine, iodine, hydrogen, acetate, carboxylate, acetylacetonato, $R^y_3P$ or $(R^yO)_3P$, where $R^y$ is preferably C1-$C_{20}$-alkyl, C5-C20-aryl, C6-C20-aralkyl, CO, or C2-C20-alkenyl.

Examples of the component A are the following rhodium compounds:
$[Rh(O_2CCH_3)_2]_2$, $Rh(O_2CCH_3)_3$, $Rh_2(C_8H_{15}O_2)_4$, $Rh(C_5H_7O_2)_3$, $Rh(C_5H_7O_2)(CO)_2$, $Rh(CO)[Ph_3P](C_5H_7O_2)Rh(CO)_2(C_5H_7O_2)$, Rh $RhCl_3[(R)_2S]_3$, $(R^y_3P)_2Rh(CO)X$, $(R^y_3P)_3Rh(CO)H$, $RhCl(PPh_3)_3$, $RhBr(PPh_3)_3$, $RhBr(PPh_3)_3$, $RhCl(PHPh_2)_3$, $RhCl[P(benzyl)_3]_3$, $RhCl(SbPh_3)_3$, $RhBF_4(cyclooctadiene)_2$, $RhH(PPh_3)_3$, $RhCl(CO)(Pn_3)_2$, $RhI(CO)(PPh_3)_2$, $RhCl(CO)$ $(PEt_3)_2$, $RhH(CO)(PPh_3)_2$, $RhCl(CO)(C_8H_{14})_2$, $RhCl(1,5$-cyclooctadiene), $RhCl(CO)_2$ (acac), $RhCl(1,5$-cyclooctadiene) (acac), $RhCl_3$, $[RhCl(C_2H_4)_2]_2$, $[RhCl(1,5$-cyclooctadiene)$]_2$, $[RhCl(CO)_2]_2$ or $Rh_4(CO)_{12}$, where $R^y$ has the meanings above.

Further examples of the component A are iridium compounds such as $Ir(OOCCH_3)_3$, $Ir(C_5H_7O_2)_3$, $[Ir(Z)(En)_2]_2$ and $[Ir(Z)(diene)]_2$, where Z is chlorine, bromine, iodine or alkoxy, En is olefin such as ethylene, propylene, butene, cyclohexene and cyclooctene and diene is cyclooctadiene. Preferred iridium catalysts are chlorobis(cyclooctane)iridium(I) dimer, chlorobis(1,5-cyclooctadiene)iridium(I) dimer and iridium(III) acetylacetonate.

Compound A may also be used in supported form, for example on $SiK_2$ or carbon.

The rhodium or iridium compound is preferably used in amounts of at least 0.1 ppm and at most 20,000 ppm, more preferably in amounts of at least 1 ppm and at most 2000 ppm, and most preferably in amounts of at least 10 ppm and at most 500 ppm of rhodium or iridium (based on the element), and based on the silazane mixture used.

The hydrosilylation is preferably conducted in an inert solvent.

Preferred solvents are aromatic hydrocarbons such as toluene or xylene, or aliphatic hydrocarbons such as cyclohexane, heptane or octane, which may also be present in the form of mixtures. Further solvents in the hydrosilylation are chlorinated hydrocarbons, such as 1,2-dichloroethane or dichloromethane, ethers such as methyl Cert-butyl ether, diethyl ether or ethylene glycol dimethyl ether.

The solvent is preferably used in proportions of at least 1% by weight to at most 10,000% by weight, more preferably in proportions of at least 10% by weight and at most 1000% by weight, and most preferably in proportions of at least 30% and at most 500%, based on the amount by weight of the silazane mixture composed of the general formulae IVa and IVb.

The hydrosilylation is preferably conducted at temperatures of at least 20° C. and at most 250° C., more preferably of at least 50° C. and at most 200° C. and most preferably of at least 80° C. and at most 150° C.

The hydrosilylated mixture is preferably not isolated but rather is directly reacted with alcohol of the general formula V.

Essentially obtained in the alcoholysis of the hydrosilylated mixture are the 3-aminopropylalkoxysilane and, as further product, an alkoxysilane $R^6OSiR^4R^5H$ which results from the alcoholysis of the compound Vb or further nitrogen-disilylated linear silazanes. This can, however, be removed very easily by distillation, since it has a considerably lower boiling point than the compound of the general formula I.

The hydrosilylated mixture is preferably alcoholyzed without workup and removal of constituents of the mixture.

A further increase in economic viability can be achieved by preparing the silazanes used for hydrosilylation and selected from the general formulae IVa and IVb by reacting an olefinic amine of the general formula II

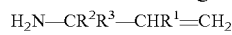
$H_2N$—$CR^2R^3$—$CHR^1$=$CH_2$      II with a chlorosilane of the general formula III

  III, where $R^1$, $R^2$, $R^3$, $R^4$ and $R^5$ have the above meanings and preferred meanings.

This produces a mixture of monosilazanes of the general formula IVa and disilazanes of the general formula IVb. This mixture can be used directly without complex separation of the two silazanes in the subsequent hydrosilylation and reaction with alcohol to form 3-aminopropylalkoxysilanes of the general formula I. The method can therefore be carried out particularly economically as a one-pot reaction.

However, it has surprisingly been found that, when using at least 2 equivalents of olefinic amine of the general formula II, especially allylamine, based on chlorosilane of the general formula III, especially dimethylchlorosilane, biphasic liquid mixtures are formed during the reaction, the lower phase of which contains the hydrochloride of the amine of the general formula II and amine having only very low proportions of silazanes (<1% by weight), and the upper phase of which essentially contains the silazane mixture of the general formula IVa and of the general formula IVb and small amounts of amine of the general formula II, especially allylamine, in the region of 10% by weight. The upper phase is moreover largely free of chloride.

As a result, the silazane mixture used for the subsequent hydrosilylation can be obtained by simple phase separation. A further advantage is that the olefinic amine of the general formula II, especially allylamine, can be completely and easily recovered from the lower phase by reacting with a base, for example aqueous sodium hydroxide solution.

In this method, a molar excess of olefinic amine of the general formula II, based on the chlorosilane of the general formula III, is preferably used, more preferably at least 1.5 equivalents and at most 20 equivalents of amine of the general formula II, based on the chlorosilane of the general formula III, are used, most preferably at least 2 equivalents and at most 10 equivalents of allylamine of the general formula II, based on the chlorosilane of the general formula III, are used. In this embodiment, a liquid biphasic mixture without any solids content is obtained, the upper phase of which contains the mixture of the silazanes of the general formulae IVa and IVb and low proportions of the amine of the general formula II and the lower phase of which contains the hydrochloride of the amine dissolved in the amine. The lower phase (salt phase) is virtually free of silanes here.

It is therefore possible to separate off the silazane mixture of the general formulae IVa and IVb, which is necessary for the hydrosilylation and forms the upper phase, by simple phase separation and—optionally after depletion of the excess amine of the general formula II, for example by stripping—to deplete the unreacted amine of the general formula II by distillation.

Amine of the general formula II can be quantitatively recovered from the lower phase and reused by adding at least molar amounts of a base, for example aqueous sodium hydroxide solution, and distillation.

The preparation of the silazane mixture of the general formulae IVa and IVb is preferably conducted at temperatures of at least 0° C., particularly preferably of at least 20° C. and most preferably at at least 30° C., and is preferably carried out at at most 150° C., more preferably at at most 100° C., and most preferably at at most 60° C. In one preferred embodiment, the amine of the general formula II is initially charged and the chlorosilane of the general formula III is added.

The preparation of the silazane mixture of the general formulae IVa and IVb can be conducted with or without solvents. If solvents are used, the solvents described for the hydrosilylation are preferred.

All the above symbols of the above formulae are each defined independently of one another. The silicon atom is tetravalent in all formulae.

In the following examples, unless otherwise stated in each case, all amounts and percentages are based on weight, all pressures are 0.10 MPa (abs.) and all temperatures are 20° C.

Example 1

664 g (11.6 mol) of allylamine are initially charged under inert gas in a 2 l round-bottom flask equipped with a KPG stirrer and reflux condenser, and slowly admixed within approximately 2 hours with 472 g (5.00 mol) of dimethylchlorosilane. The mixture is left to cool to ambient temperature and the phases are separated. The weight of the separated upper phase is 502 g, the weight of the separated lower phase 616 g.

Composition of the phases (GC area %):
a) lower phase (GC of the MTBE-soluble fractions): <1% silanes, >99% allylamine (allylamine hydrochloride is not detected)
b) upper phase (GC in MTBE): 13% allylamine, 38% monosilazane IVa, 48% disilazane IVb.

The upper phase contains approximately 17 ppm of chloride (determined by ion chromatography).

The upper phase is partially distilled at a bath temperature of 115° C. 34 g of allylamine are recovered here. The silazane mixture remaining in the bottom still contains approximately 4% allylamine.

Example 2

Recovery of Allylamine 60 g of the lower phase from example 1 are admixed with a solution of 25 g of NaOH and 78 g of water and the solution obtained is distilled over a random packed column. 43 g of pure allylamine is obtained at a top temperature of 63° C.

Example 3

Hydrosilylation 60 g of the partially distilled upper phase from example 1 [composition: 28% by weight (146 mmol) monosilazane and 64% by weight (222 mmol) disilazane] are dissolved in 120 ml of toluene and admixed with 5.5 mg of bis(1,5-cyclooctadiene)dirhodium(I) dichloride (proportion of Rh approximately 41%, corresponding to approximately 40 ppm of Rh based on the silazane mixture) in 1.5 ml of xylene. The mixture is heated to 110° C., with it starting to boil. After a total reaction time of 60 min, the mixture is left to cool, admixed with 19 g of methanol and left to stand overnight at room temperature.

The mixture is subsequently fractionated and distilled under reduced pressure at a pressure of 80 mbar. 39 g (264 mmol, 72%) of 3-aminopropyldimethylmethoxysilane with approximately 2-4% of 1-methyl-2-aminoethyldimethylmethoxysilane are obtained.

Example 4

Hydrosilylation

The experiment is conducted analogously to example 3 with 33 ppm of bis(1,5-cyclooctadiene)dirhodium(I) dichloride. 38 g of 3-aminopropyldimethylmethoxysilane are obtained.

Example 5

Experiments are conducted analogously to example 2 with the following additional hydrosilylation catalysts (in each case 50 ppm of Rh), which lead to comparable product yields:
tris(triphenylphosphine)rhodium(I) chloride, dichlorotetraethylenedirhodium(I), acetylacetonato(1,5-cyclooctadiene)rhodium(I) 99% [12245-39-5], chlorodicarbonylrhodium(I) dimer, carbonylchlorobis(triphenylphosphine)rhodium(I), rhodium(III) chloride hydrate.

The invention claimed is:

1. A method for synthesizing a 3-aminopropylalkoxysilane of the formula I $$H_2N-CR^2R^3-CHR^1-CH_2-SiR^4R^5(OR^6) \quad I,$$

comprising:
a) hydrosilylating a silazane of the formulae IVa or IVb

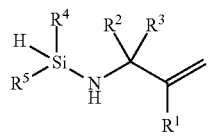

IVa

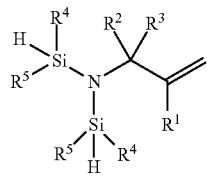

IVb or a mixture thereof, in the presence of a catalyst A which comprises a rhodium compound, an iridium compound, or a mixture thereof to form a hydrosilylated product, and
b) reacting the hydrosilylated product from step a) with an alcohol of the formula V $$R^6-OH \quad V,$$

and recovering the 3-aminopropylalkoxysilane of the formula (I),
where
$R^1$ to $R^3$ independently of one another are hydrogen or a monovalent unsubstituted or substituted $C_1$-$C_{20}$ hydrocarbon radical optionally bridged by hydrocarbon radicals, and wherein one or more methylene units in the hydrocarbon radical are optionally replaced by —O—, —CO—, —COO—, —OCO— or —OCOO—, —S— or $NR^x$ groups, provided that when two or more methylene groups are so replaced, they are non-adjacent,
$R^4$ and $R^5$ independently of one another are a monovalent unsubstituted or substituted $C_1$-$C_{20}$ hydrocarbon radical optionally bridged by hydrocarbon radicals, and wherein one or more methylene units in the hydrocarbon radical are optionally replaced by —O—, —CO—, —COO—, —OCO— or —OCOO—, —S— or $NR^x$ groups, provided that when two or more methylene groups are so replaced, they are non-adjacent,
$R^6$ is a hydrocarbon radical having 1 to 8 carbon atoms, where one or more non-adjacent carbon atoms are optionally replaced by oxygen provided that when two or more carbon atoms are replaced by oxygen, the carbon atoms are non-adjacent, and
$R^x$ is a monovalent unsubstituted or substituted $C_1$-$C_{20}$ hydrocarbon radical optionally bridged by hydrocarbon radicals, wherein one or more methylene units in the hydrocarbon radical are optionally replaced by —O—, —CO—, —COO—, —OCO— or —OCOO—, —S— groups, provided that when two or more methylene groups are so replaced, they are non-adjacent.

2. The method of claim 1, wherein $R^1$ is hydrogen.

3. The method of claim 1, wherein $R^2$ and $R^3$ independently of one another are hydrogen or a methyl group.

4. The method of claim 2, wherein $R^2$ and $R^3$ independently of one another are hydrogen or a methyl group.

5. The method of claim 1, wherein $R^4$ and $R^5$ independently of one another are monovalent unsubstituted $C_1$-$C_6$ hydrocarbon radicals.

6. The method of claim 1, wherein $R^6$ is a hydrocarbon radical having 1 to 4 carbon atoms.

7. The method of claim 1, wherein the catalyst A comprises at least one Rh or iridium complex that is 4-coordinate or 6-coordinate.

8. The method of claim 7, in which the Rh and iridium complexes have ligands selected from the group consisting of halide, hydrogen, $BF_4^-$, mono- or bidentate N, P, As or Sb, N-heterocyclic carbene or alkenyl ligands, carbon monoxide, and mixtures thereof.

9. A method for synthesizing a 3-aminopropylalkoxysilane of the formula I $$H_2N-CR^2R^3-CHR^1-CH_2-SiR^4R^5(OR^6) \quad I,$$

comprising:
a) in a first step, reacting an olefinic amine of the formula II $$H_2N-CR^2R^3-CHR^1=CH_2 \quad II$$

with a chlorosilane of the formula III $$ClSiR^4R^5H \quad III,$$

forming a silazane mixture comprising silazanes of the formulae IVa and IVb

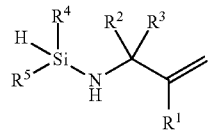

IVa

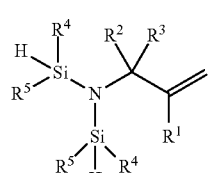

IVb b) in a second step, hydrosilylating the silazane mixture obtained in step a) in the presence of a catalyst A which comprises a rhodium compound, an iridium compound, or a mixture thereof to form a hydrosilylated product, and c) reacting the hydrosilylated product of step b) with an alcohol of the formula V $$R^6\text{—OH} \qquad \qquad V,$$

where $R^1$ to $R^3$ independently of one another are hydrogen or a monovalent unsubstituted or substituted $C_1$-$C_{20}$ hydrocarbon radical optionally bridged by hydrocarbon radicals, and wherein one or more methylene units in the hydrocarbon radical are optionally replaced by —O—, —CO—, —COO—, —OCO— or —OCOO—, —S— or $NR^x$ groups, provided that when two or more methylene groups are so replaced, they are non-adjacent, $R^4$ and $R^5$ independently of one another are a monovalent unsubstituted or substituted $C_1$-$C_{20}$ hydrocarbon radical optionally bridged by hydrocarbon radicals, and wherein one or more methylene units in the hydrocarbon radical are optionally replaced by —O—, —CO—, —COO—, —OCO— or —OCOO—, —S— or $NR^x$ groups, provided that when two or more methylene groups are so replaced, they are non-adjacent, $R^6$ is a hydrocarbon radical having 1 to 8 carbon atoms, where one or more non-adjacent carbon atoms are optionally replaced by oxygen, provided that when two or more carbon atoms are replaced by oxygen, the carbon atoms are non-adjacent, and $R^x$ is a monovalent unsubstituted or substituted $C_1$-$C_{20}$ hydrocarbon radical optionally bridged by hydrocarbon radicals, wherein one or more methylene units in the hydrocarbon radical are optionally replaced by —O—, —CO—, —COO—, —OCO— or —OCOO—, or —S— groups, provided that when two more methylene groups are so replaced, they are non-adjacent.

10. The method of claim 9, in which, in the step a), at least 2 mole equivalents of olefinic amine of the formula II, based on chlorosilane of the formula III, are used, and where a biphasic liquid mixture formed during the reaction comprises a lower phase which contains the hydrochloride of the amine of the formula II and an upper phase which contains a silazane mixture comprising silanes of the formulae IVa and IVb, are separated from each other by phase separation prior to step b).

* * * * *